United States Patent [19]
Cooper et al.

[11] Patent Number: 5,452,948
[45] Date of Patent: Sep. 26, 1995

[54] APPARATUS AND METHOD FOR ELECTRONICALLY CONTROLLED HYDRAULIC ACTUATOR

[75] Inventors: Ralph M. Cooper, Clemmons; Donald G. Stille, Winston-Salem, both of N.C.

[73] Assignee: The Whitaker Corporation, Wilmington, Del.

[21] Appl. No.: 320,621

[22] Filed: Oct. 7, 1994

[51] Int. Cl.⁶ ................................................. B60T 8/32
[52] U.S. Cl. .............................. 303/119.2; 303/113.1; 137/884
[58] Field of Search ................ 303/119.2, 113.1, 303/113.2, 119.1; 137/884, 596.16, 596.17; 29/827, 847; 439/34, 692, 639; 251/129.15; 335/202, 277, 278, 219, 299; 336/92, 192

[56] References Cited

U.S. PATENT DOCUMENTS

| | | | |
|---|---|---|---|
| 4,697,863 | 10/1987 | Galloway et al. | 439/544 |
| 4,785,532 | 11/1988 | Galloway et al. | 29/827 |
| 4,842,525 | 6/1989 | Galloway et al. | 439/34 |
| 5,374,114 | 12/1994 | Burgdorf et al. | 303/119.2 |
| 5,407,260 | 4/1995 | Isshiki et al. | 303/119.2 |

FOREIGN PATENT DOCUMENTS 4-127057  11/1992  Japan.

Primary Examiner—Douglas C. Butler
Attorney, Agent, or Firm—Bruce Wolstoncraft

[57] ABSTRACT

An electronically controlled hydraulic unit (10) for use in an anti-lock braking system in an automobile and a method of assembling a coil mounting subassembly are disclosed. The coil mounting assembly includes a wiring or printed circuit board (48, 148, 248) on which toroidal coils (16) are mounted with traces leading to pin terminals (46, 146, 246) to attach this wiring or printed circuit board subassembly to an electronic control board (56). Coils are soldered to this board in a conventional offline soldering operation. The coil wiring or printed circuit board is mounted to a peripheral housing frame (34, 134) and a peripheral seal (42, 142) is located between the wiring or printed circuit board and the housing frame. The printed circuit board serves as a sealing bulkhead when mounted between the electronic control board and a hydraulic pump subassembly.

24 Claims, 8 Drawing Sheets

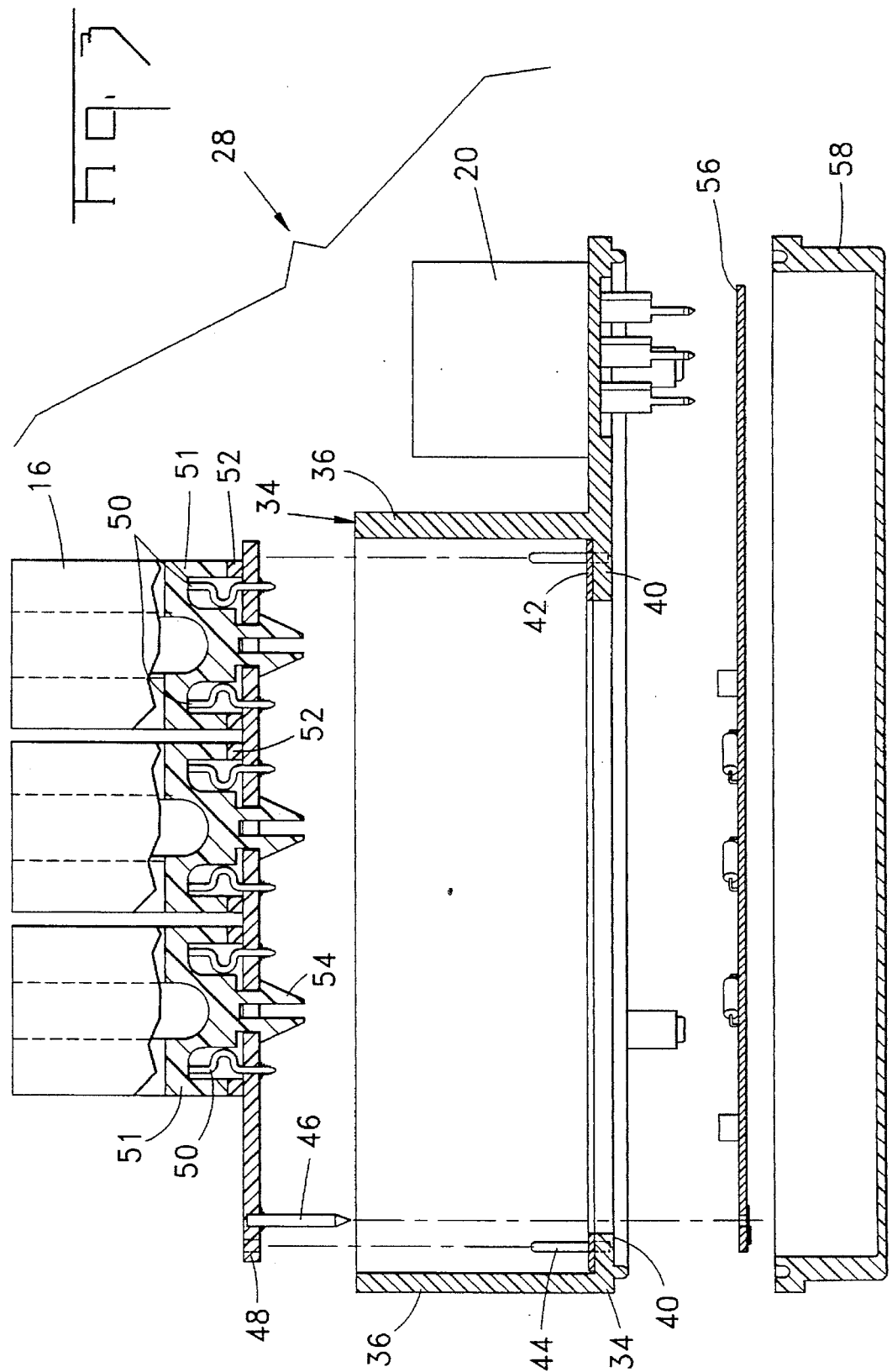

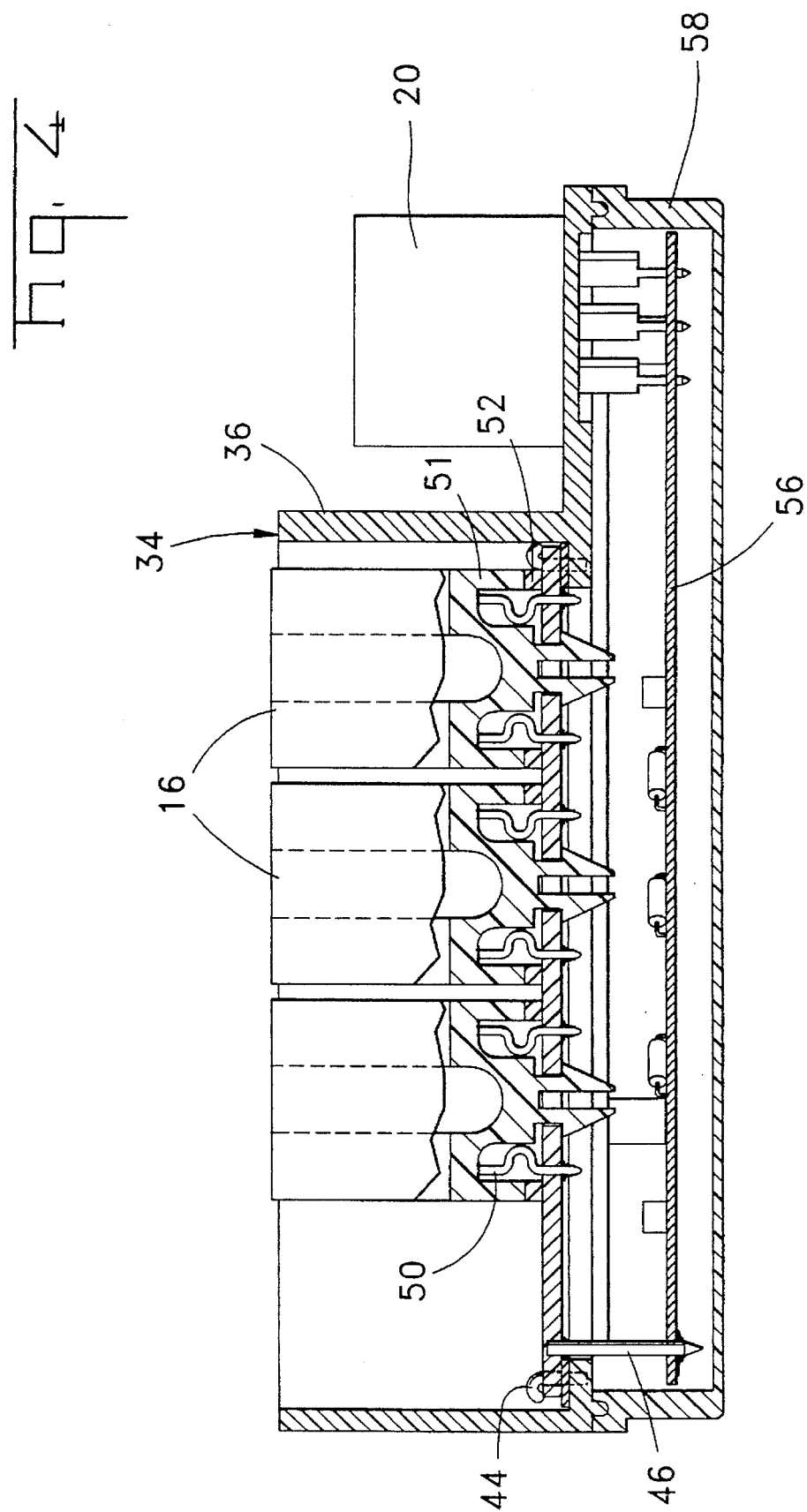

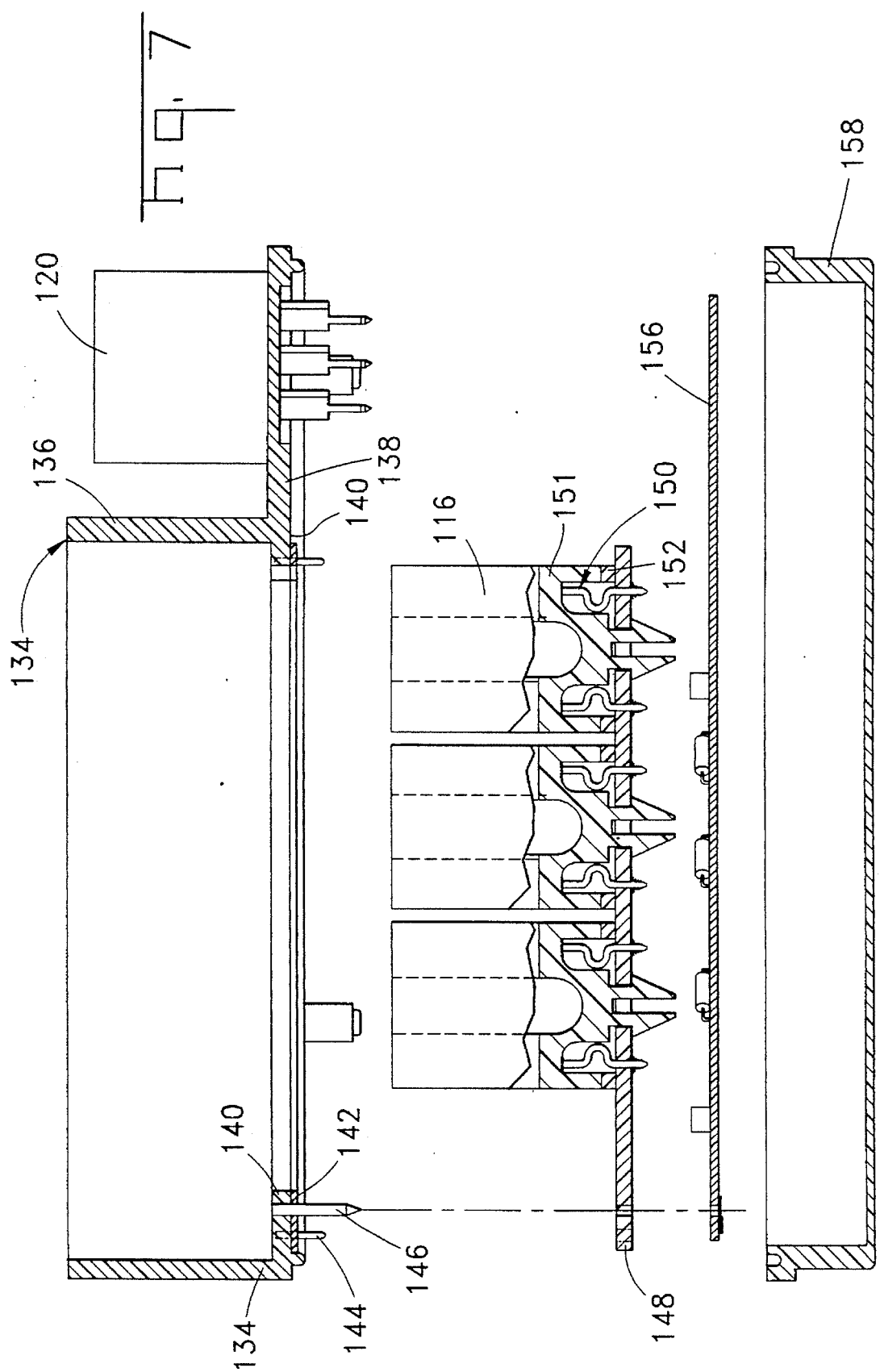

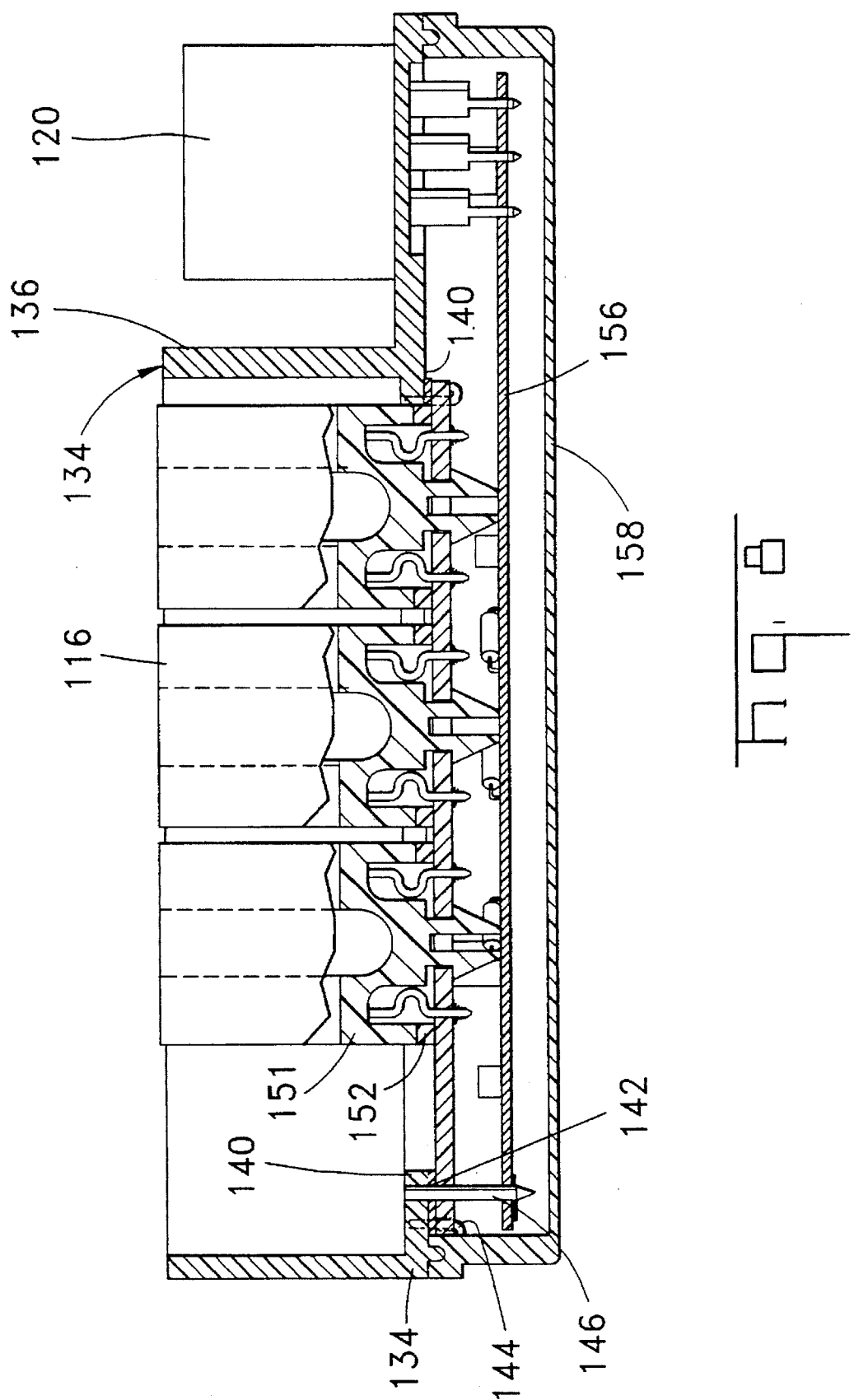

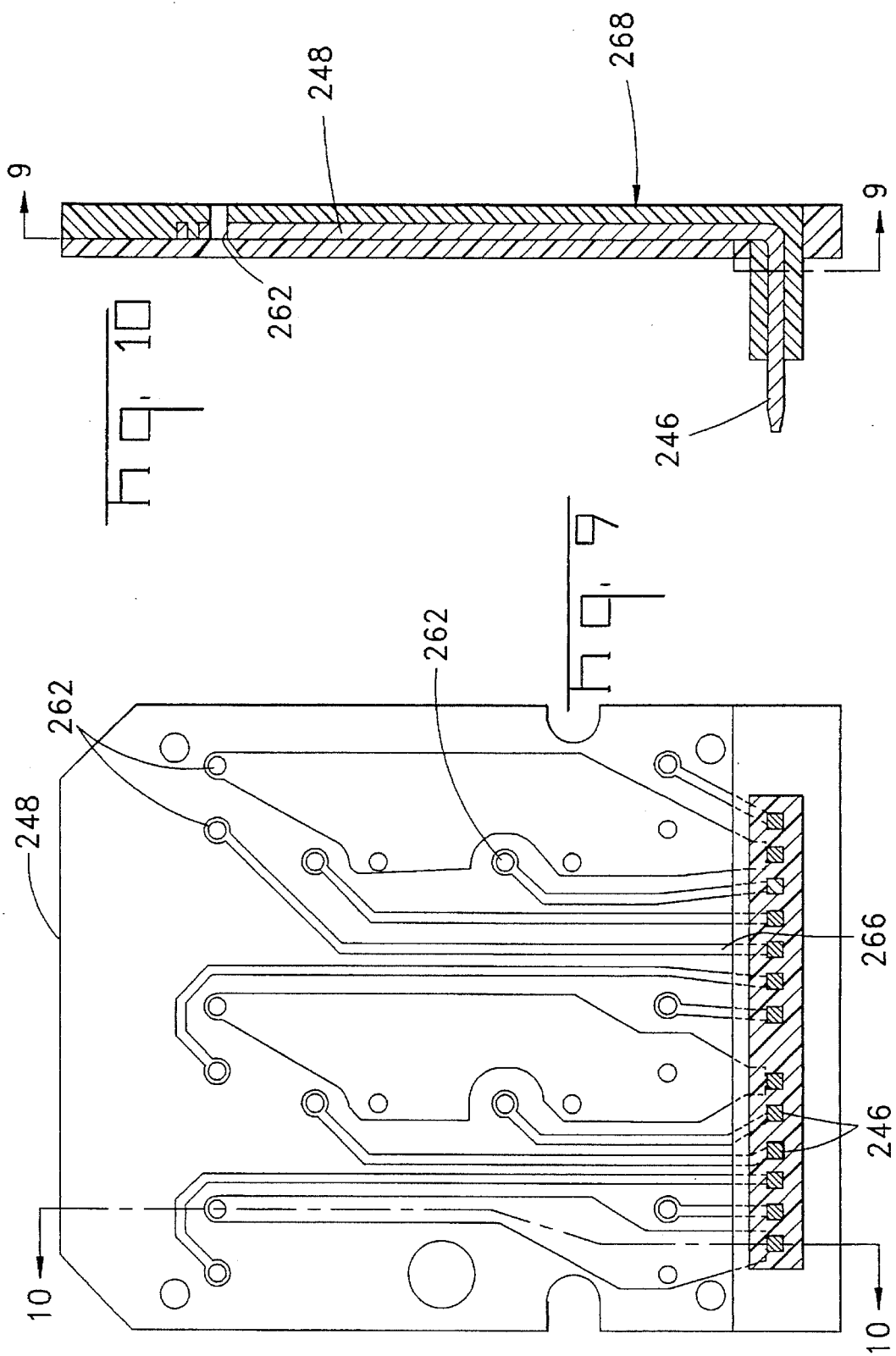

APPARATUS AND METHOD FOR ELECTRONICALLY CONTROLLED HYDRAULIC ACTUATOR

BACKGROUND OF THE INVENTION

1. Field of the Invention

This invention relates to the fabrication of a sealed and shielded hydraulic pump assembly for use in a system such as an anti-lock braking system on an automobile. Hydraulic valves or actuators are controlled by an electronic control unit which applies electric current to solenoid coils surrounding the valves to actuate the valves. The assembly is sealed and a seal is established between a hydraulic subassembly and the electronic control subassembly.

2. Description of the Prior Art

The hydraulic unit for anti-lock braking systems on automobiles includes a hydraulic pump and an electrical control unit. The hydraulic pump or valve actuator unit of these devices includes a number of valves or domes in the form of cylindrical members or fingers. The valve element in these cylindrical members is actuated by the magnetic force induced by the current flowing in a toroidal solenoid coil in which the cylindrical member fits. Standard units can have six to ten valve actuators.

Commercially available systems employ an assembly consisting of two separate components. A hydraulic control unit containing the valves and coils for activating the valves are housed in one unit. An electronic control unit is located in a separate unit and connected to the hydraulic control unit by electrical cable.

Other prior art systems have been designed in which the hydraulic control unit and the electronic control unit are housed as part of the same assembly. In these single assembly configurations, the hydraulic control unit or subassembly must be isolated from the electronic control unit or subassembly. The two subassemblies must be hydraulically isolated. These single assembly prior art devices have solenoid coils located in a coil chamber located between the unit containing the hydraulic valves and the electronic control unit which applies a current to the appropriate coil to activate the corresponding valve. These coils have a winding mounted on a bobbin which is in turn encased in a metallic coil housing. Coil leads extend from the lower coil housing. A number of these individual coils are mounted in a coil chamber housing consisting of a plastic housing having pillars extending upward from the lower surface of the coil housing to define individual, substantially cylindrical, cavities into which individual coils are inserted. A gasket is positioned between the individual coil housing and the floor of the coil chamber housing to provide a resilient spring force between the coil and the floor.

After the coils are inserted in the coil chamber housing, the coil leads extend through openings in the floor of the coil chamber housing where they can be connected to the electronic control unit. This connection can be established by soldering the coil leads to a lead frame molded in the housing. Alternatively they can be soldered directly to a printed circuit board which comprises the main substrate for the electronic control subassembly, or they can be soldered to a separate printed circuit board which is heat staked on the exterior of the floor of the coil chamber housing.

Several different versions of these assemblies, each containing a different number of coils, are commonly used. The same coil chamber housing is typically used for multiple configurations to eliminate the cost of multiple molds. In order to maintain the integrity of the floor of the coil chamber housing, which serves as a sealing bulkhead, these holes must be filled by a separate manufacturing operation, adding additional cost to the product. One method of filling these holes is to pot the lower portion of the inner chamber of the coil chamber housing.

After assembling the coils in the coil chamber housing, this subassembly can be tested for electrical continuity and integrity or this test can be done after interconnection of the coil to the electronic control unit. In either case, any defect in the coils or the coil subassembly will be difficult or impossible to repair, thus adding cost to the final product.

SUMMARY OF THE INVENTION

This invention relates to an improved hydraulic pump assembly which can be part of an anti-lock braking system in an automobile. This assembly includes a hydraulic valve subassembly, an electronic control subassembly and a coil mounting subassembly. The coil mounting subassembly comprises a wiring board, such as a printed circuit board, to which a number of individual coils are soldered. The wiring or printed circuit board is then mounted in a peripheral frame with a peripheral seal engaging both the frame and the wiring or printed circuit board. The wiring or printed circuit board will then serve as a sealing bulkhead or wall when the hydraulic valve subassembly is mounted on one end of the peripheral frame and the electronic control subassembly is mounted to the other end of the peripheral frame. The wiring or printed circuit board and the peripheral frame, which is otherwise open on both the top and bottom will then effectively seal the electronic control subassembly from the hydraulic valve subassembly.

The wiring or printed circuit board can also be double sided with one side having a substantially continuous conductive layer which can serve as an EMI/RFI shield. In combination with an external cover, the shield provided by this printed circuit board can reduce the susceptibility of the electronic control unit to external radiation or reduce the radiation emitted by the electronic control unit. This shield can be used in conjunction with the sealed unit or separately.

The method of fabricating this unit includes the steps of first soldering all of the coils to the coil printed circuit board. Different wiring or printed circuit boards dependent upon the desired coil population can be used eliminating the need to fill unused openings in the member forming the sealing bulkhead. Prior to further assembly operations, this coil wiring or printed circuit board subassembly can be tested. The coil wiring or printed circuit board can then be assembled to a peripheral mounting frame with a peripheral seal being formed. Alternatively the board may be sealed on either the upper or the lower face. This peripheral frame and the coil wiring or printed circuit board now form a coil and sealing subassembly to which the hydraulic subassembly and the electronic control subassembly can be mounted on opposite ends of the peripheral frame with the coil wiring or printed circuit board now forming a sealing bulkhead between them.

A paramount object of this invention is to reduce the cost of the entire electronically controlled hydraulic pump assembly. This invention achieves that object by reducing the cost of components, by eliminating assembly operations and by reducing costs associated with defective components or subassemblies. A key feature of this invention is that the coil subassembly is adapted for offline assembly. The coils can be attached to the printed circuit board by conventional soldering processes such as through hole soldering or reflow soldering. This subassembly can then be tested prior to its use with other subassemblies and prior to other assembly operations. Rework is now possible and will be less expensive. Furthermore this offline assembly operation is conventional in nature. Other components are not unnecessarily exposed to wave or reflow soldering operations. Thus the plastic housing is not exposed to he high temperatures associated with soldering operations and less expensive materials can be employed.

By initially mounting the coils to the printed circuit board, the mounting frame now becomes a simpler pan. This reduces the complexity and therefore cost of the mold as well as reducing mold cycle time. A simpler part also requires less material resulting in an additional cost saving.

Manufacturing steps required by the use of a common part can also be eliminated. No longer is a potting operation necessary to fill unused opening in the floor of the housing. The tooling costs required to produce different boards for each coil population are insignificant when compared to mold tool costs to make different molded parts.

BRIEF DESCRIPTION OF THE DRAWINGS

FIG. 3 is a sectional view of the peripheral mounting frame to which a top loaded coil printed circuit board is mounted.

FIG. 4 is a sectional view similar to section 3 showing the assembly of the coil printed circuit board and the electronics control unit printed circuit board to the peripheral frame.

FIG. 7 is a view similar to the view of FIG. 3, but showing a embodiment in which the coil printed circuit board is mounted from the bottom.

FIG. 8 is a sectional view similar to FIG. 4 showing of the components of the embodiment of FIG. 7 in their assembled configuration.

FIG. 9 is a view of an insert molded wiring board which can be used instead of a conventional fiberglass printed circuit board laminate.

FIG. 10 is a sectional view of the insert molded wiring board taken along section lines 10—10 in FIG. 9.

DETAILED DESCRIPTION OF THE PREFERRED EMBODIMENTS

Figure 1:
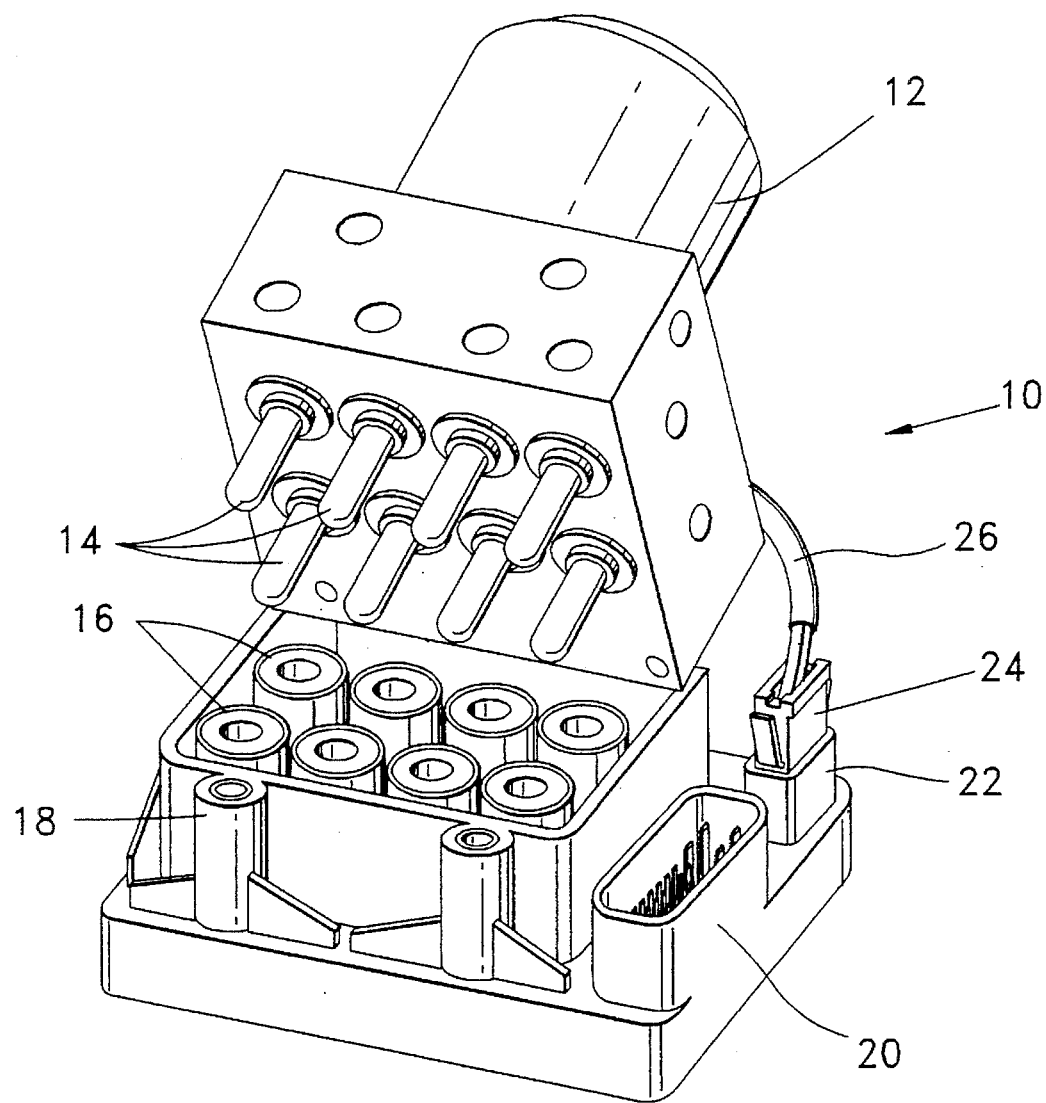
FIG. 1 is a view of the hydraulic unit in which the hydraulic unit containing the pump and valves with the hydraulic control unit shown partially removed to depict the coils and the valves.

The electronically controlled hydraulic unit 10 shown in FIG. 1 is intended for use in an anti-lock braking system in an automobile. As shown in FIG. 1, the hydraulic actuator unit, subassembly or pump 12 is shown partially removed to expose the interior of the unit. More specifically the orientation of FIG. 1 is intended to show the valve actuators 14 on the hydraulic unit 12 and the solenoid coils 16. The pump 12 and the valve subassembly containing valves 14 are part of the same hydraulic actuator subassembly. The valve actuators 14 are referred to as domes and comprise generally cylindrical members. When the unit is properly assembled, these valve actuators extend through the center of the toroidal coils 16 so that the magnetic field induced by the application of an electrical current to the coils 16 causes the valve located in the corresponding valve actuator member 14 to move between a seated and an unseated position. Bosses 18 which receive conventional fastening members, not shown are shown on the exterior of the body of the assembly. For example bolts extending upward through bosses 18 could be used to attach the hydraulic subassembly 10 in position. Other conventional fastening means, such as clamps, or other similar devices known to one skilled in the art could also be employed.

The hydraulic unit 10 also includes an input output connector 20 located on the exterior of the coil chamber in which the coils 16 are located. This electrical connector 20 provides for the input and output of both electrical power and signal currents to the device. A second connector in the form of header 22 mates with connector 24 to deliver power over external cable 26 to the hydraulic pump 12.

Figure 2:
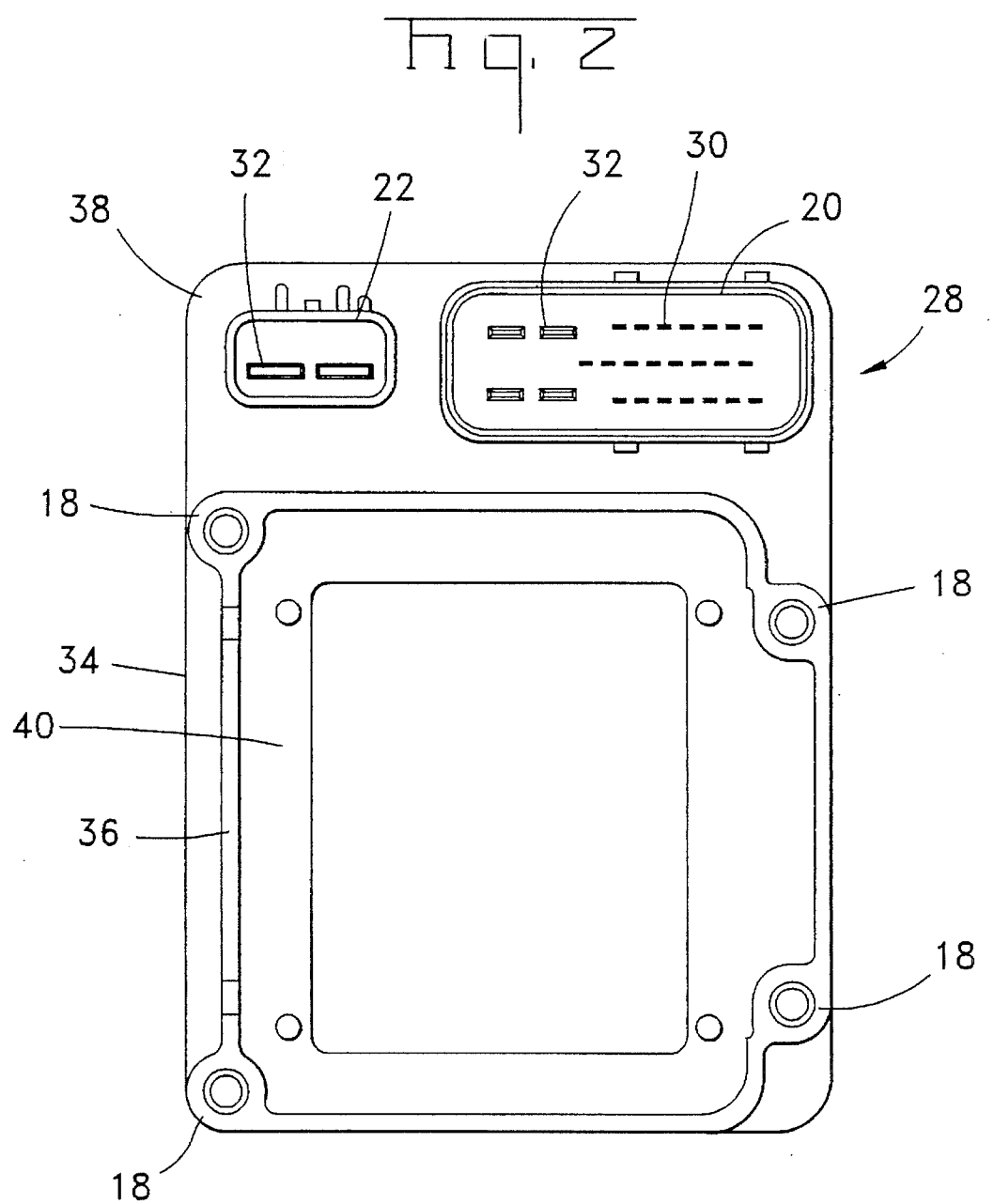
FIG. 2 is a top plan view of the interior of a first embodiment of the peripheral housing frame in which the coil is mounted and to which the hydraulic actuator subassembly and the electronic control subassembly will be mounted.

FIG. 2 is a top plan view of the peripheral coil mounting housing frame 34 of the first embodiment of this invention. Signal terminals or pins 30 and power pins 32 in connectors 20 and 22 are visible in this view. These pins can be stitched in the plastic coil mounting housing 34 in a conventional manner. The coil mounting housing 34 has continuous peripheral sidewalls 36 extending upward from the base of the housing 34 to form a coil chamber in which a plurality of coils 16 can be located. The sidewalls are shown more clearly in FIG. 3. The pin header connectors 20 and 22 are located on an extension of the base 38 of the coil mounting housing 34. The coil mounting housing 34 also contains a sealing rim 40 consisting of an upwardly facing surface surrounding the central area in which the coils will be positioned. In the embodiment of FIG. 2, this sealing rim comprises an upwardly facing surface which extends completely around the inner periphery of the sidewalls 36.

The exploded section view of FIG. 3 shows the components of the coil mounting subassembly 28, the electronic control unit control board 56 and the lower cover 58. The coil mounting subassembly 28 comprises the coils 16 mounted to coil printed circuit board 48, which is mounted in the coil mounting housing 34 formed by sidewalls 36, and a resilient seal 42 which maintains sealing integrity between the coil printed circuit board 48 and the coil housing 34. In this embodiment a plurality of electrical contact terminals in the form of pins 46 are also mounted on the coil printed circuit board 48. These pins are shown in a conventional single row configuration.

Each of the coils 16 has two coil leads 50 extending from the bottom. These coil leads are bent to provide resiliency so that the solder joint will not be stressed when a compressive load is applied to the coil in the direction parallel to the axis of the coil. Although not shown, these coils are otherwise conventional in construction. A winding on a bobbin is housed in a metallic coil enclosure with the coil leads extending axially from the bottom of the bobbin. A coil seal or gasket 52 is positioned between each coil 16 and the printed circuit board 48. In the embodiment shown herein this gasket is secured to the outer periphery of a coil mounting seat 51 which includes a snap in hold down feature 54 extending from the center of the gasket. This hold down feature extends through a hole in the coil printed circuit board and secures the coil to the printed circuit board. This coil seat can be secured to the printed circuit board and the coil can be subsequently snapped into engagement with this seat 51. Alternatively the hold down seat can be insert molded to the coil 16 and its outer metal coil housing and the hold down feature 54 can be used to secure the coil 16 to the printed circuit board 48. When the gasket or seal 52 is compressed a seal is formed prohibiting the passage of fluids through the printed circuit board hole in which the hold down is located. In addition to providing sealing integrity, this seal or gasket 52 also imparts resilience to the coils so that when a downward load toward the coil printed circuit board is applied to the coil, the seal or gasket resists that force and urges the coil upward. This significance of this resilience will be subsequently described. It should be understood that the seal or gasket 52 can also be mounted to the coil 16 by insert molding the seal to the exterior of the coil body.

The sidewalls 36 on the coil mounting housing are shown in section in FIG. 3. FIG. 2 shows that these sidewalls are continuous to form a frame or shroud extending around all four sides of the coil cavity defined by the housing 34. This cavity is open on both the top and the bottom of sidewalls 36. A sealing rim 40 having an upwardly facing surface extends completely around the inner periphery of the upstanding sidewalls 36. The opening defined by this sealing rim is smaller than the coil printed circuit board 48 so that the coil printed circuit board overlaps the sealing rim 40 around its entire peripheral length. A seal 42 is positioned on the upper surface of the sealing rim 40 between the sealing rim and the coil printed circuit board 48. This seal 42 may be a resilient member or it may be a viscous sealing material deposited on the sealing rim Conventional materials are available to form a suitable seal of this type when placed under compression. In this configuration, the coil wiring board subassembly, comprising a plurality of coils 16 soldered to the coil printed circuit board 48, is mounted in the coil housing 34 by inserting the coil wiring board subassembly into the open top of the housing 34. The coil printed circuit board 48 can then be seated on the sealing rim with the seal 42 maintaining sealing integrity therebetween. One or more staking pins 44 extending upwardly from the housing 34 can be bent over to hold the coil printed circuit board securely in place.

FIG. 4 shows coil subassembly secured to the coil housing 34. FIG. 4 also shows the assembled configuration of the electronic control printed circuit board 56. As depicted herein, this printed circuit board contains a number of components, shown here only in representative form. The exact configuration of this control board does not form part of the subject matter of the invention disclosed herein. This control board subassembly includes the hardware of the electronic control subassembly or unit. Note that pins 46 can be soldered to control board 56 after assembly of the coil board 48 in housing 34. As part of the same operation, the pins in the input/output header 20 can also be soldered to control board 56. In the position shown the coil printed circuit board 48 now forms a sealing bulkhead above the control board 56. As shown in FIG. 4, the tops of coils 16 extend above the upper edge of the sidewalls 36 of the housing frame 34. When the hydraulic actuator subassembly is secured the subassembly shown in FIG. 4, the lip surrounding the base of the valves engage the tops of the metal coil housing of coils 16 forming a tight metal to metal interface. The coils are forced down and the resilient coils sealing members 52 exert a force urging the metal coil housings of coils 16 upward into engagement with valve lips. A continuous magnetic flux path is thus formed through the coil housing and the metal valves.

Figure 6:
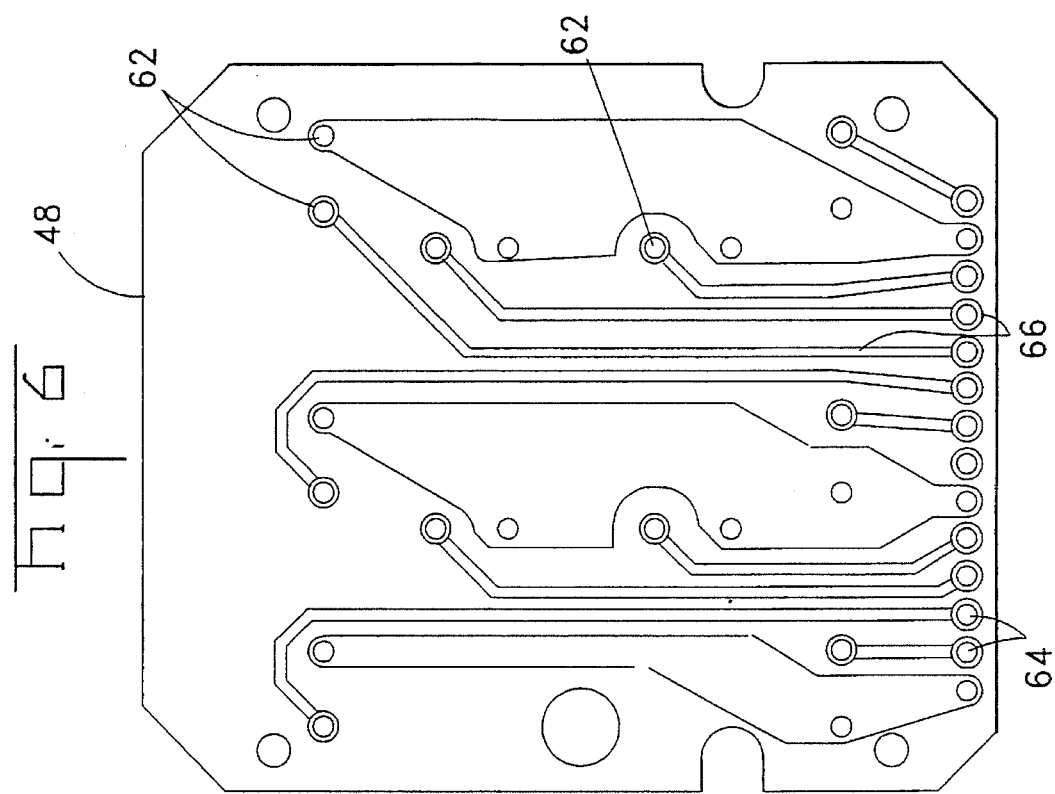
FIG. 6 is a view of the opposite solder side of the coil printed circuit board showing the traces connecting individual coils to terminals for connecting the coils to the electronic control unit.
Figure 5:
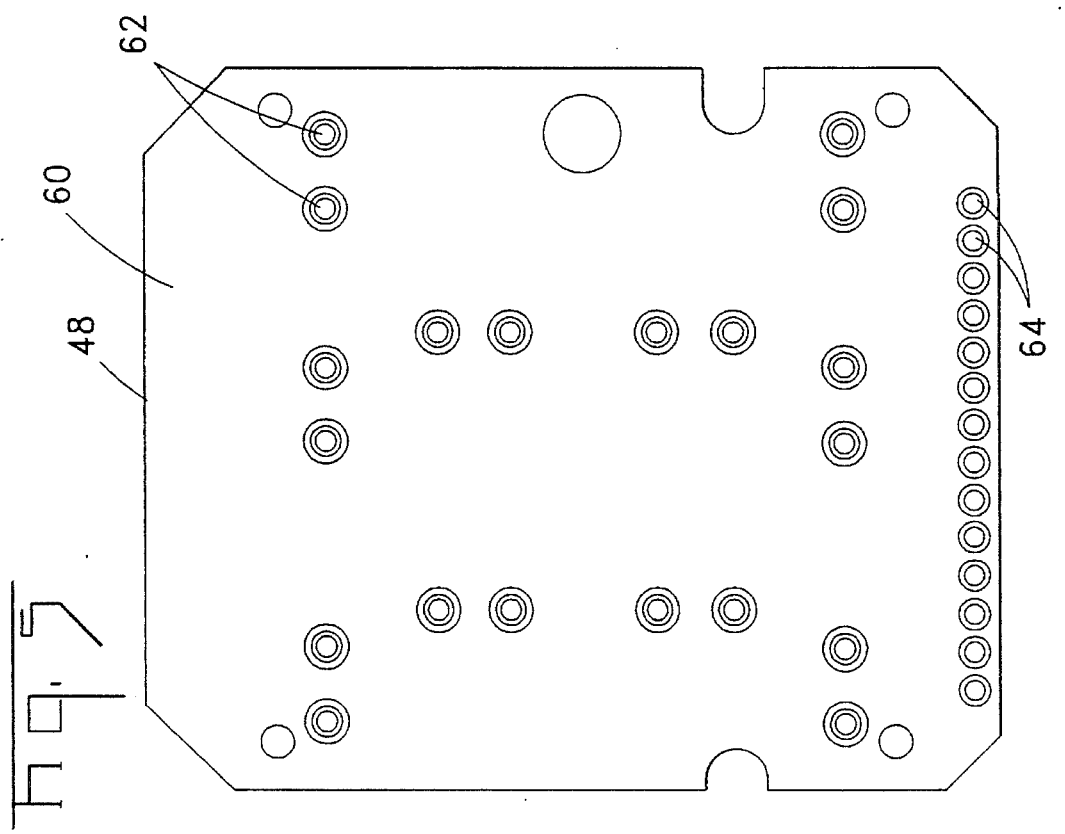
FIG. 5 is a view of one surface of the coil primed circuit board showing a substantially continuous conduction layer which serves as an electrical shield.

FIGS. 5 and 6 show both sides of the double sided coil printed circuit board 48. FIG. 5 shows the bottom or solder side of the board. Plated through holes 62 are provided so that the coils 16 can be soldered to this board. Header 64 is a connector with a plurality of terminals or pins 46 soldered to the printed circuit board 48. These pins can be soldered in plated through holes which are obstructed by the presence of the header in FIG. 5. Substantially all of the side of the printed circuit board 48 shown in FIG. 5 has a substantially continuous conductive surface 60 which can serve as a shield. In the preferred embodiment, this conductive surface 60 comprises a layer of copper deposited on the insulative substrate. Portions of this copper layer surrounding the plated through holes 62 have been etched to provide an annular insulating area surrounding the solder joints connecting the coils 16 and the pins 46 to the plated through holes. This conductive layer can serve as a shield since it is positioned on one side of the control printed circuit board 56. This conductive layer could also serve as a ground plane. The electronic circuits on this control board can thus be shielded from electromagnetic radiation along this side of the assembly. Alternatively this shield would also prevent radiation emanating from the electronic control circuit from affecting other components. FIG. 6 shows the opposite coil mounting or component side of printed circuit board 48. The traces 66 which would connect the coils 16 to the pins 46 are shown in FIG. 6. In the preferred embodiment this printed circuit board would be a conventional 0.062 inch thick FR-4 printed circuit board. Alternatively thicker boards could be employed.

FIGS. 7 and 8 show an alternative version of assembly in which the printed circuit board 148 is mounted to the peripheral housing frame 134 from the bottom instead of from the top as in the embodiment of FIGS. 2–6. FIGS. 7 and 8 show the bottom mounted embodiment in a fashion analogous to the way that FIGS. 3 and 4 show the top mounted embodiment. The sealing rim 140 comprises a downwardly facing annular surface along which a seal 142 is located. This seal 142 engages the top surface or component side of the coil printed circuit board 148. In the embodiment of FIG. 7, the terminals or pins 146 are not initially mounted in a printed circuit board header as for the top mounted version. In this embodiment the pins 146 are stitched in the housing 134 using a conventional terminal assembly stitching machine. Thus the pins are not soldered to the coil printed circuit board 148 until after this board is mounted on the housing frame 134. This embodiment does require staking or mounting pins 144. Other components of the second embodiment perform similar functions to the corresponding component of the first embodiment. This similarity is represented by using a "1" prefix for the corresponding component. For example coil 116 corresponds to coil 16 of the first embodiment.

The first and second embodiments of this invention show the use of a conventional copper laminate printed circuit board. These printed circuit boards comprise only one type of wiring board which can be employed. FIGS. 9 and 10 show an insert molded wiring board 248 in which a stamped and formed lead frame is used. Insert molding in a conventional operation in which the lead frame is mounted in a mold and then plastic is injected around the lead frame. Portions of the lead frame are then severed to form distinct traces which serve the same purpose as traces on conventional printed circuit boards. As shown in FIG. 9 these lead frame traces include holes 262 through which coil leads 52 can be inserted. Solder pads, which are integral portions of the lead frame traces, surround these holes and the coil leads can be soldered directly to these pads in a conventional fashion. As shown in FIG. 10, the pins 246 are also integral portions of the lead frame which have been formed at right angles to the portion of the lead frame which forms the traces. Plastic has been insert molded around portions of the pin 246 leaving the ends of the pins exposed for soldering to the control board. This plastic surrounding pins 246 can serve as wiring board separators and it also serves to secure the lead frame to the plastic substrate. The insert molded wiring board 248 of the type shown in the embodiment of FIGS. 9 and 10 can be substituted directly for the printed circuit boards 48 and 148 of the first two embodiments.

The assembly operations of both embodiments of this invention are conventional and these components are reliably manufacturable. The components are first soldered to the wiring or printed circuit board using conventional soldering operations. For example, the components can be wave soldered. If the first embodiment is wave soldered, a secondary operation will be necessary to remove solder deposited on the pins 46. This operation can be performed with a hot air knife and is a conventional operation. Alternatively solder paste can be deposited on printed circuit pads adjacent to the plated through holes, and a surface mount operation, such as reflow soldering can be used to solder the coils and the pins to the printed circuit board. These same conventional offline soldering operations can also be employed to solder coils to the insert molded wiring board 248 of FIGS. 9 and 10. The seals 24 can be molded elastomer seals or a viscous sealant can be deposited along the sealing rim. This sealant can also be an adhesive. The materials used for the seal are conventional and readily available. The housing frame is an injection molded member which can be easily fabricated. No special materials are necessary. Pins 46, 146 or 246 can also be soldered to the control boards 56 and 156 can be soldered using conventional techniques.

Although three embodiments are depicted herein, it will be appreciated by those skilled in the art that numerous other equivalent embodiments can be used in the same manner as those depicted herein. These two embodiments are intended to be representative only.

We claim:

1. A sealing subassembly for use with an electrically controlled hydraulic unit, the sealing subassembly separating a first hydraulic actuator subassembly from a second electronic control subassembly, the sealed subassembly housing a plurality of coils used for actuating hydraulic actuators, the sealed subassembly comprising:

a housing frame having peripheral sidewalls with open top and bottom ends, the housing frame having mounting means for attaching first and second subassemblies to the top and to the bottom of the housing frame;

a sealing rim extending around the peripheral side walls of the housing frame;

a coil wiring board subassembly mounted on the housing frame, the coil wiring board subassembly having a plurality of coils soldered thereto and having traces extending from the coils to corresponding terminals mounted on the coil wiring board subassembly, the coil wiring board subassembly being impervious to the passage of fluid therethrough to provide a sealing bulkhead; and a seal engaging both the sealing rim and the coil wiring board subassembly, whereby the hydraulic actuator subassembly can be attached to one end of the housing frame and the electronic control unit can be attached to the other end of the housing frame with the coil wiring board subassembly providing a sealing bulkhead between the electronic control subassembly and the hydraulic actuator subassembly.

2. The sealing subassembly of claim 1 wherein the sealing rim extends around the interior of the housing frame sidewalls.

3. The sealing subassembly of claim 1 wherein the coil wiring board subassembly is staked to the housing frame.

4. The sealing subassembly of claim 1 the seal comprises a viscous sealant.

5. The sealing subassembly of claim 1 wherein the coils have through hole leads soldered to the coil wiring board.

6. The sealing subassembly of claim 1 wherein the coil wiring board comprises a double sided board, one side of the coil wiring board having a substantially continuous conductive layer to form a shield on one side of the electronic control subassembly.

7. The sealing subassembly of claim 1 wherein the sealing rim comprises a surface facing the hydraulic actuator subassembly.

8. The sealing subassembly of claim 1 wherein the sealing rim comprises a surface facing the electronic control subassembly.

9. The sealing subassembly of claim 1 wherein the mounting means imparts a compressive load on the seal.

10. The sealing subassembly of claim 9 wherein the mounting means also brings the hydraulic actuator subassembly into engagement with the coils to apply a force on the coil wiring board, the coil wiring board being supported by the housing frame.

11. The sealing subassembly of claim 1 further including a coil seal forming a seal between each coil and the coil wiring board.

12. The sealing subassembly of claim 11 wherein discrete coil seals are mounted on each coil.

13. The sealing subassembly of claim 11 wherein discrete coil seals are attached to the coil wiring board to form coil mounting pedestals.

14. The sealing subassembly of claim 1 wherein the terminals extend from the opposite side of coil wiring board from the coils for engagement with mating terminals on the electronic control subassembly to establish an electrical connection between the coils and the electronic control subassembly.

15. The sealing subassembly of claim 14 wherein the terminals comprise pins staked in housing frame.

16. The sealing subassembly of claim 1 including a resilient gasket located between each coil and the wiring board, the resilient gasket exerting a force on the corresponding coil to urge the corresponding coil away from the coil wiring board.

17. The sealing subassembly of claim 1 wherein the wiring board comprises a printed circuit board.

18. The sealing subassembly of claim 1 wherein the wiring board comprises leads formed from a lead frame insert molded in a plastic substrate.

19. An improved hydraulic pump assembly for use in an anti-lock braking system in an automobile comprising:
- a hydraulic valve subassembly including a plurality of valves;
- a plurality of toroidal coils, each of the valves extending through the center of a corresponding coil;
- an electronic control unit applying an electric current to individual coils to actuate the corresponding valve;
- the improvement comprising a coil mounting subassembly including;
- a coil wiring board mounted between the hydraulic valve subassembly and the electronic control unit, the coils being mounted on the coil wiring board with traces on one side of the coil wiring board extending between coils and corresponding terminals also mounted on the coil wiring board, the terminals interconnecting the coil wiring board to the electronic control unit, the opposite side of the coil wiring board having a substantially continuous conductive layer to form a electrical shield on one side of the electronic control unit.

20. An improved hydraulic pump assembly for use in an anti-lock braking system in an automobile comprising:
- a hydraulic valve subassembly including a plurality of valves;
- a plurality of toroidal coils, each of the valves extending through the center of a corresponding coil;
- an electronic control unit applying an electric current to individual coils to actuate the corresponding valve;
- the improvement comprising a coil mounting subassembly including;
- a coil wiring board to which the individual coils are soldered;
- a plurality of pins for connecting the coils to the electronic control unit, traces on the coil wiring board connecting the coils to corresponding pins;
- a mounting frame open four sidewalls, the frame and the coil wiring board sealing the hydraulic valve subassembly from the electronic control unit when the electronic control unit is positioned on the opposite side of the coil mounting subassembly from the hydraulic valve subassembly, whereby the coils can be initially soldered to the coil board before the coil mounting subassembly is attached to the electronic control unit.

21. The improved hydraulic pump assembly of claim 20 wherein the coil wiring board and the mounting frame are separate members attached to each other prior to assembly of the coil mounting subassembly to the electronic control unit.

22. An improved hydraulic pump assembly for use in an anti-lock braking system in an automobile comprising:
- a hydraulic valve subassembly including a plurality of valves;
- a plurality of toroidal coils, each of the valves extending through the center of a corresponding coil;
- an electronic control unit applying an electric current to individual coils to actuate the corresponding valve;
- the improvement comprising a coil mounting subassembly including;
- a coil wiring board to which the individual coils are soldered;
- a plurality of pins for connecting the coils to the electronic control unit, traces on the coil wiring board connecting the coils to corresponding pins;
- a mounting frame open on the top and bottom and having four sidewalls, the frame including an annular sealing rim; and
- a seal positioned between the coil wiring board to seal the hydraulic valve subassembly from the electronic control unit when the electronic control unit is positioned on the opposite side of the coil mounting subassembly from the hydraulic valve subassembly, whereby the coils can be initially soldered to the coil wiring board before fabrication of the coil mounting subassembly.

23. A method of fabricating an electronically controlled hydraulic assembly including valves actuated by solenoid coils to seal an electronic control subassembly from a hydraulic subassembly comprising the steps of:
- soldering a plurality of solenoid coils to a wiring board to form a coil wiring board subassembly;
- testing the coil wiring board subassembly for electrical continuity and integrity before assembling the coil wiring board subassembly to other subassemblies to complete the hydraulic subassembly;
- mounting the coil wiring board subassembly to a peripheral frame and positioning a peripheral seal between the peripheral frame and the coil wiring board, the peripheral seal surrounding the plurality of solenoid coils,
- mounting the electronic control subassembly to the top of the peripheral frame and the hydraulic subassembly to the bottom of the peripheral frame with the wiring board forming a sealing bulkhead between the electronic control subassembly and the hydraulic subassembly.

24. The method of claim 23 wherein the valves are positioned in the solenoid coils so that the wiring board is assembled with the coils being on the same side of the sealing bulkhead as the hydraulic subassembly.

* * * * *